(12) United States Patent
Carlsson

(10) Patent No.: US 7,735,614 B2
(45) Date of Patent: Jun. 15, 2010

(54) IMPACT ATTENUATOR FOR VEHICLE AND METHOD

(75) Inventor: Arne Carlsson, Vålberg (SE)

(73) Assignee: Impact Absorption, Inc., Douglastown, NY (US)

( * ) Notice: Subject to any disclaimer, the term of this patent is extended or adjusted under 35 U.S.C. 154(b) by 697 days.

(21) Appl. No.: 10/591,837

(22) PCT Filed: Mar. 4, 2005

(86) PCT No.: PCT/SE2005/000323

§ 371 (c)(1),
(2), (4) Date: Sep. 5, 2006

(87) PCT Pub. No.: WO2005/085008

PCT Pub. Date: Sep. 15, 2005

(65) Prior Publication Data

US 2007/0187201 A1 Aug. 16, 2007

(30) Foreign Application Priority Data

Mar. 4, 2004 (SE) .................................... 0400535

(51) Int. Cl.
*F16F 7/12* (2006.01)

(52) U.S. Cl. .................. 188/377; 188/372; 293/107; 293/110

(58) Field of Classification Search .......... 188/371, 188/372, 377; 280/460.1, 474; 293/104, 293/107, 110
See application file for complete search history.

(56) References Cited

U.S. PATENT DOCUMENTS

| 3,822,076 | A | * | 7/1974 | Mercier et al. | 293/107 |
|---|---|---|---|---|---|
| 3,971,583 | A | * | 7/1976 | Kornhauser | 293/110 |
| 4,099,759 | A | * | 7/1978 | Kornhauser | 293/110 |
| 4,674,911 | A | * | 6/1987 | Gertz | 404/6 |
| 4,711,481 | A | * | 12/1987 | Krage et al. | 293/133 |
| 5,101,927 | A | * | 4/1992 | Murtuza | 180/275 |
| 5,199,755 | A | * | 4/1993 | Gertz | 293/120 |
| 5,248,129 | A | | 9/1993 | Gertz | |
| 5,403,113 | A | | 4/1995 | Gertz et al. | |
| 5,823,584 | A | * | 10/1998 | Carney, III | 293/102 |
| 6,279,973 | B1 | * | 8/2001 | Albertini et al. | 293/107 |
| 6,866,284 | B2 | | 3/2005 | Carlsson | |

FOREIGN PATENT DOCUMENTS

| EP | 0 586 071 A1 | 3/1994 |
|---|---|---|
| WO | WO 01/87671 A1 | 11/2001 |

\* cited by examiner

*Primary Examiner*—Christopher P Schwartz
(74) *Attorney, Agent, or Firm*—Jacobson Holman PLLC

(57) ABSTRACT

An impact attenuator, which is arranged to be flexible longitudinally as well as sideways, has a rear part with two wheels, an attenuating part, a front part with two pivot wheels, and a coupling part for connection to a vehicle. The coupling part has a damper for dampening part of the force during a collision against the impact attenuator. During a minor collision against the impact attenuator the collision force is mainly absorbed by the damper. The damper regains after a collision its original position and the impact attenuator can remain operative. During a larger collision against the impact attenuator, the collision forces are also absorbed by the attenuating part.

18 Claims, 5 Drawing Sheets

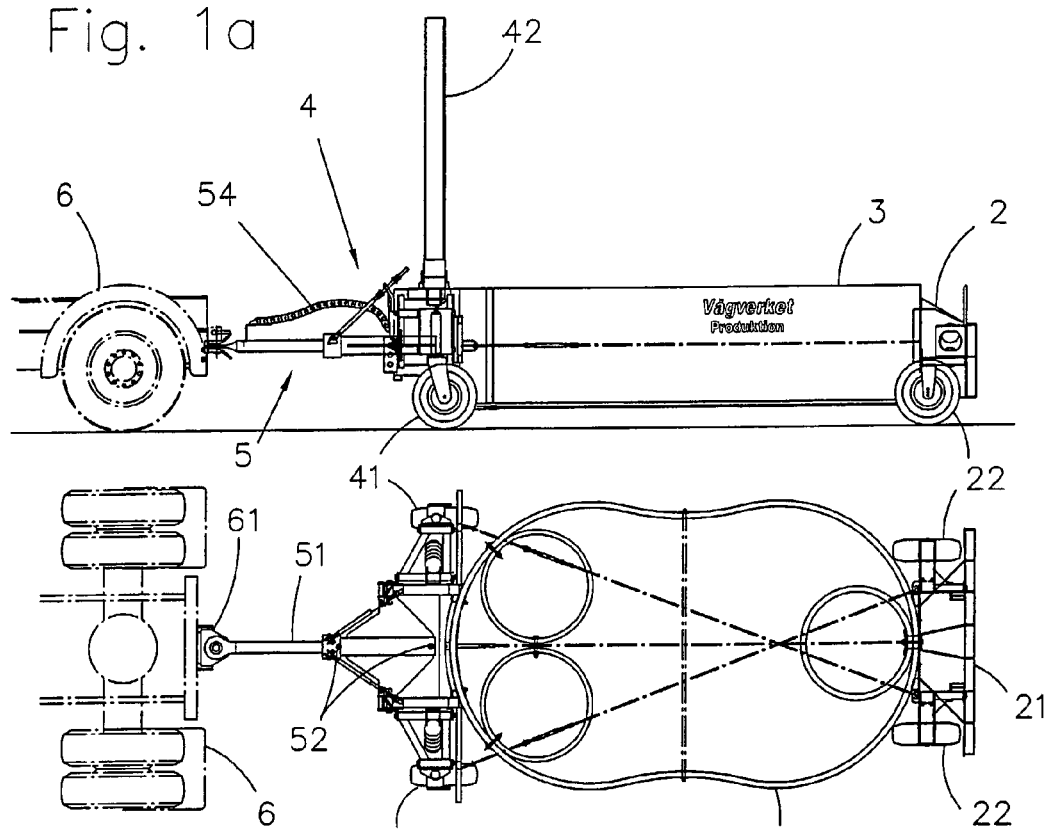
Fig. 1a
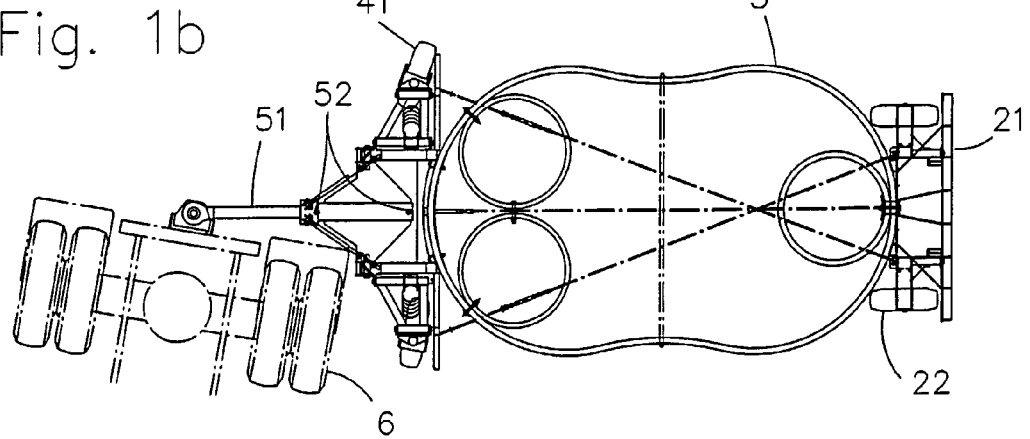
Fig. 1b
Fig. 1c

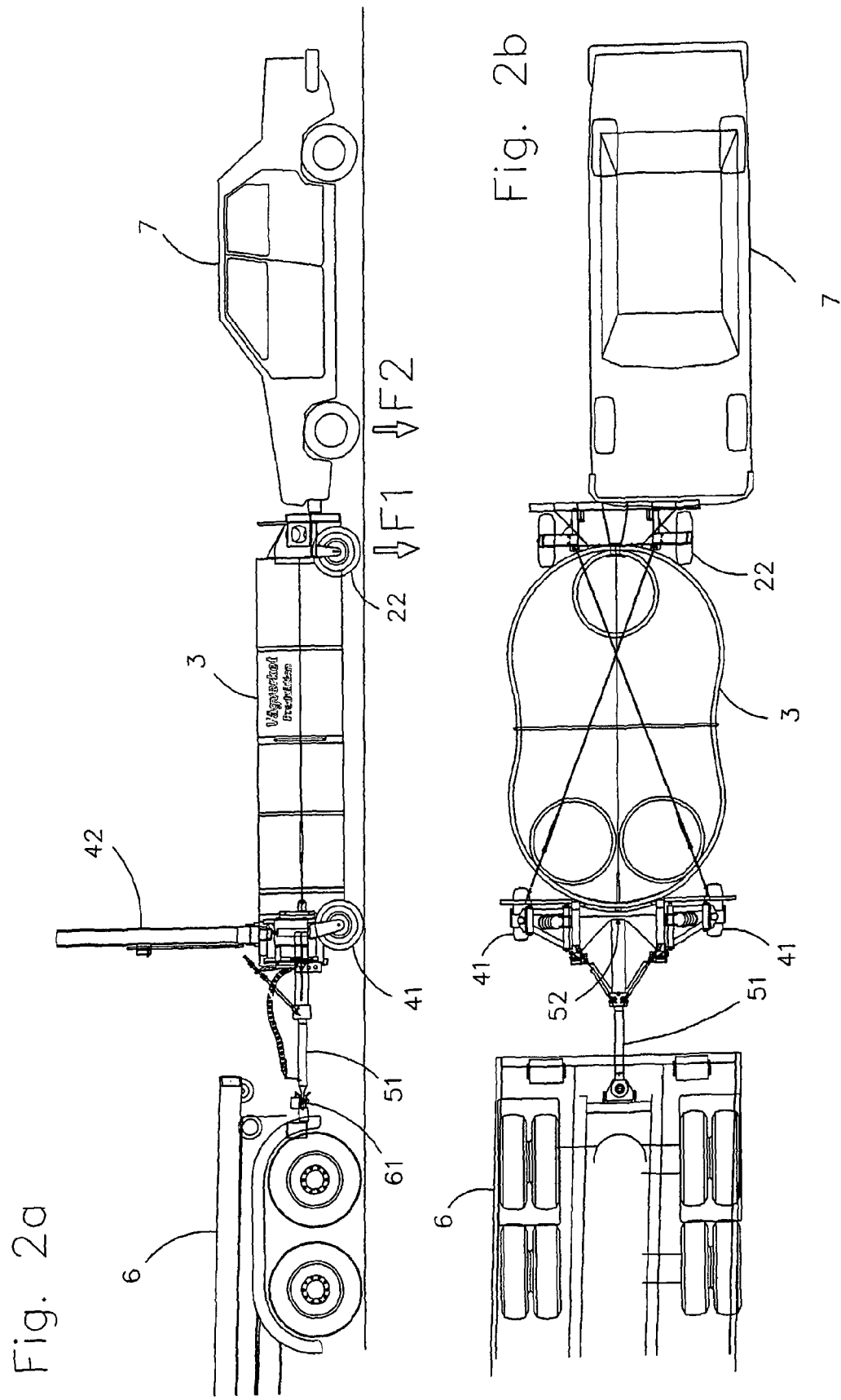

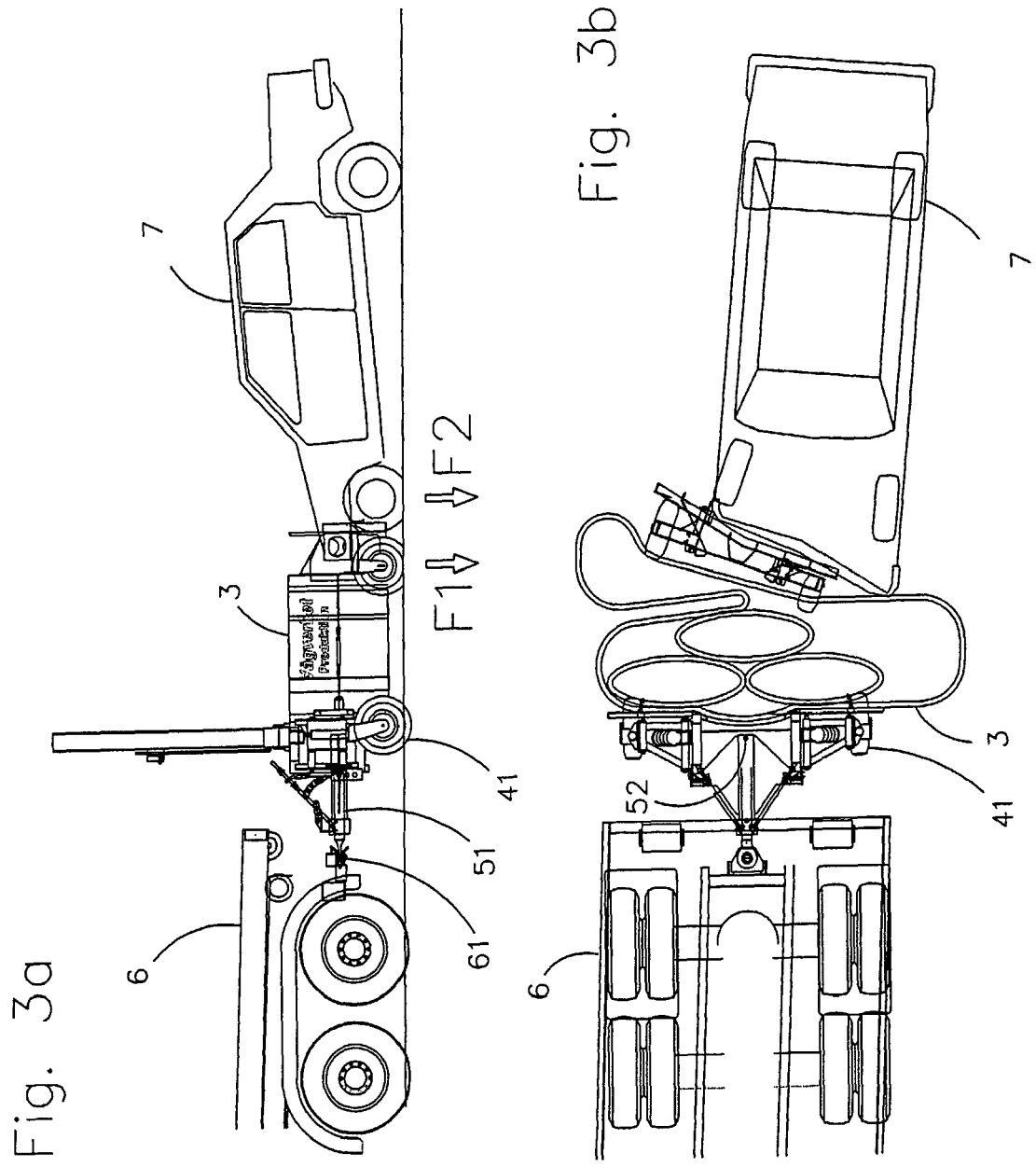

IMPACT ATTENUATOR FOR VEHICLE AND METHOD

CROSS-REFERENCE TO RELATED APPLICATION

This is a nationalization of PCT/SE2005/000323 filed 4 Mar. 2005 and published in English.

BACKGROUND OF THE INVENTION

1. Field of Invention

The present invention relates to an impact attenuator to be connected to a vehicle, and a method to drive such a device.

2. Description of the Prior Art

Impact attenuators are used, at e.g. roadwork areas, to protect road-users, men at work and equipment. The impact attenuators task is to, in a soft way, stop vehicles from entering the roadwork area. This is achieved by an attenuation device that dampens the force of collision from a colliding vehicle by deformation of the construction, e.g. by a metal construction with zones of deformation or an elastical construction of polymeric material.

Common to all impact attenuators are that they during operation are firmly connected to the vehicle to establish a rigid extension of the vehicle. This is because during a collision against the impact attenuator the forces of collision partly shall be absorbed by the vehicle and to prevent the impact attenuator from moving sideways before it has absorbed the major part of the forces.

A usual type of impact attenuator is securely attached to the vehicle and foldable between an operating position and a raised transport position. Another type of impact-attenuating device is disclosed in WO 01/87671 A1. The disclosed impact attenuator has a front member connecting the impact attenuator to a vehicle. The impact attenuator can be connected in a transporting position, through a drawbar, in which the impact attenuator is connected as a trailer to the vehicle, or in an operating position, through two beams, in which the impact attenuator is connected as a rigid extension of the vehicle.

A drawback with both these types of impact attenuators is that they need to change between the operating position and the transport position. This means that there must be equipment for changing between the two positions. Furthermore there is a need for safety arrangements for securing that the impact attenuator is in the right position.

SUMMARY OF THE INVENTION

The invention, which relates to an impact attenuator similar to the one described in WO 01/87671 A1, has several functions making it possible to change between the two positions, and lock the impact attenuator in respective position. A problem with these functions is that they make the impact attenuator more expensive. Furthermore, one of the functions may get broken which results in that the whole impact attenuator must be taken out of service.

With a solution according to the invention these functions will not be needed. The impact attenuator is connected in the same way during both operation and transport.

The invention is an improvement compared to known state of the art. The solution is described in the following independent claims with embodiments described in the accompanying dependent claims.

BRIEF DESCRIPTION OF THE DRAWINGS

The invention will now be described in more detail with reference to the following drawings:

FIG. 1a shows an impact-attenuating device according to the invention.

FIG. 1b shows an impact-attenuating device from above.

FIG. 1c shows an impact-attenuating device during a turn.

FIG. 2a shows an impact-attenuating device from the side.

FIG. 2b shows an impact-attenuating device from above.

FIG. 3a shows an impact-attenuating device during an offset collision.

FIG. 3b shows an impact-attenuating device during a collision from above.

DETAILED DESCRIPTION OF THE PREFERRED EMBODIMENTS

Figure 4A:
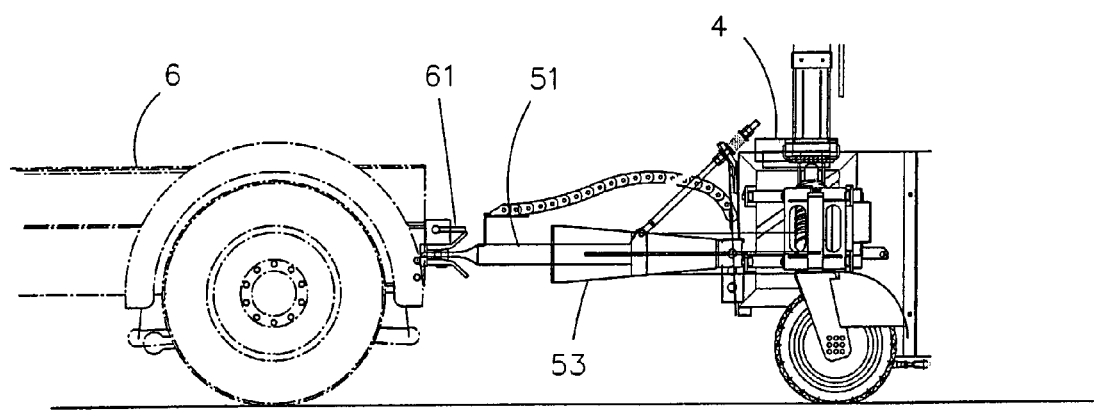
FIG. 4a-b shows a second embodiment of the invention during operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 discloses an impact-attenuating device according to the invention. The impact-attenuating device (1) comprises a rear part (2), an attenuating part (3) and a front part (4). The rear part (2) has a collision plate (21) in order to secure the colliding vehicle, so that it does not slide of or continue along the impact-attenuating device (1). The collision plate (21) can for example have a rough chessboard pattern. The rear part (2) also has two wheels (22) with suspension. The rear part (2) is attached to the attenuating part (3), which is disclosed as a construction of elastic polymer material. The front part (4) comprises two pivot wheels (41), a coupling part (5) for connection to a vehicle (6), and a device (42) for carrying signal equipment, such as light boards, traffic signs etc. The coupling part (5), comprising a damper (51), is connected in one end to the front part (4) and in the other end to the towing device (61) of the vehicle, usually a VBG-towing device. The damper (51) is arranged to dampen part of the force during a collision against the impact-attenuating device. The coupling part (5) comprises also a cable support (54) with for example electrical wiring and hydraulic/pneumatics. The cable support (54) is arranged so that it can easily bend and protect the content from being squeezed or in other ways damaged when the damper (51) moves.

During a minor collision against the impact-attenuating device the forces of collision are mainly absorbed by the damper (51). The damper (51) regains, after the collision, its original position and the impact-attenuator can continue to operate. During a larger collision against the impact-attenuator the forces of collision are absorbed also by the attenuating part (3).

The invention implements this by a damper (51) which absorb forces up to a pre-determined pressure against the damper (51) after which the attenuating part (3) absorbs the rest of the forces of collision.

Preferably the damper (51) collapses when the pre-determined pressure is attained. One way to achieve this is that the damper (51) comprises a medium, which is evacuated at the pre-determined pressure. The evacuation of the pressure can be done by a pressure device (52) of some sort. If air is used as the medium a safety valve or a bursting disc can be used as a pressure device (52). If hydraulic oil is used as a medium it its unsuitable to release it freely, but instead can a hydraulic damper communicate with an hydraulic accumulator which collects the hydraulic oil during high pressure against the damper and send it back when the pressure decreases. The damper can also comprise a mechanical spring system, in a corresponding arrangement, arranged to collapse at a pre-defined pressure.

It is also possible to use a damper without a pressure device. The drawback with this solution is that there is a risk that the damper is deformed during a collision and that the whole impact-attenuating device thereby is out of order until the damper is changed. During road works it is important to avoid standstills because there are a number of machines involved at once and the accessibility for the traffic is limited.

The damper is in the shown embodiment disclosed as an air damper with a possibility to evacuate air from the damper if the pressure is high enough. The damper (51) is connected to the air pressure system of the vehicle or the impact-attenuators own air pressure system. In order to avoid that the damper gets folded or in other ways get damaged during a collision, the damper has a pressure device (52) which releases a part of the overpressure which arises when the cylinder is pressed together during a collision. The pressure device (52) is released during a major collision against the impact-attenuator, suitably at app. 7 bar, and releases the pressure so that an overpressure of one bar remains in the cylinder. It is an advantage if the damper has some resilient function even after the pressure device is released (it is however not necessary). When the pressure device (52) is released the damper collapses. After the collision the damper is filled with air again. Smaller collision, when the pressure device is not released, is in this way absorbed by the impact attenuator (1) without affecting the vehicle (6).

Figure 4B:
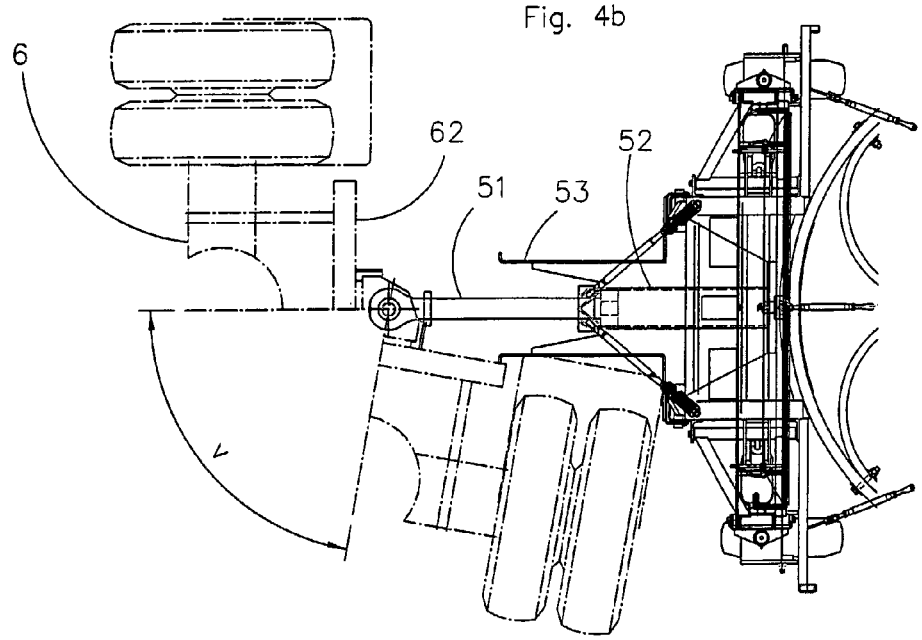
Figure 5A:
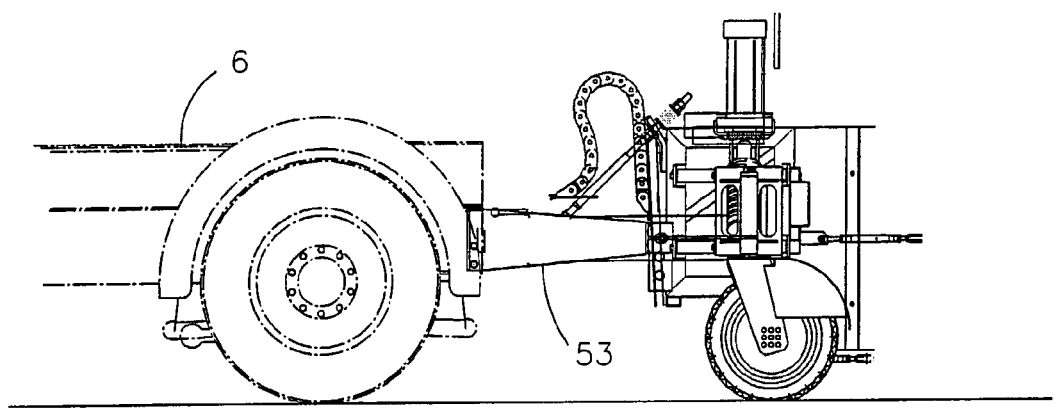
FIG. 5a-b shows a second embodiment during a collision.
Figure 5B:
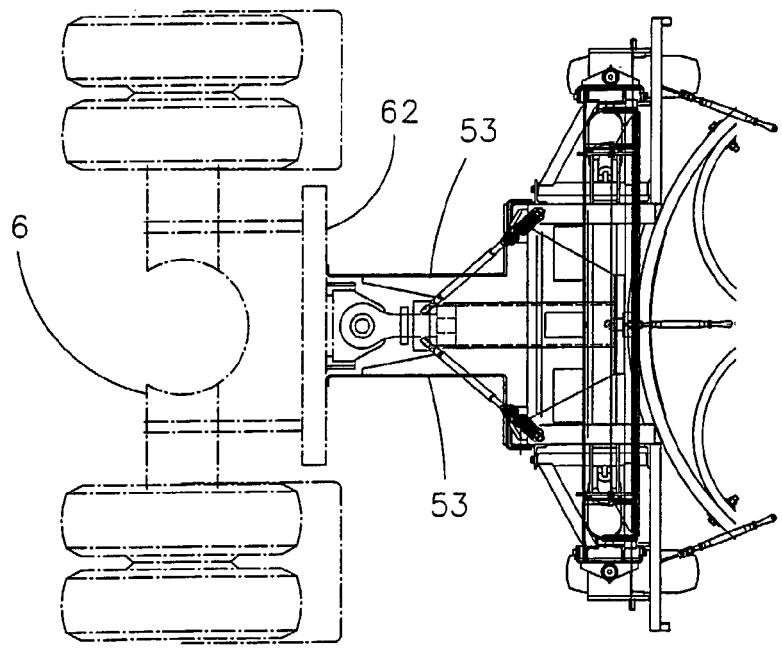

FIG. 4*a-b* discloses a second embodiment of the invention. The coupling part (5) of the impact-attenuator comprises a damper (51) longitudinally resilient. Parallel on both sides of the coupling part (5) are beams (53) for transferring forces arranged. The beams (53) are arranged to reach the vehicle when the pressure device (52) on the damper (51) is released (or the equivalent for an hydraulic damper) and the damper collapses. FIG. 5*a-b* show how the beams (53) bear on the vehicle next to the towing device (61). In the figures the vehicle is equipped with a VBG-towing device and on such a towing device there is a towing beam (62) attached to the vehicle (6). The beams (53) in FIG. 5 bear on this towing beam (62), which also means that no modification on the vehicle needs to be done. The beams (53) transfer the forces of collision to the vehicle (6) and make the impact attenuator more stable during the end of the lapse of collision and also spare the towing device (61).

Known impact attenuators are all rigidly connected to the vehicle during operation, e.g. through beams connected between the impact attenuator and the vehicle. This has until now been considered the only possible solution in order to absorb the forces arising during a collision against an impact attenuator. The drawback with this is the deteriorated accessibility in a traffic environment or equipment for changing the position of the impact attenuator from a rigid position to a more flexible position, e.g. as a trailer connected to the vehicle during transportation.

The invention relates to an impact attenuator, which is not connected as a rigid extension of the vehicle. The impact attenuator is instead connected flexible sideways (as a trailer). Consequently, the impact attenuator is connected as a trailer also during operation.

The impact attenuator according to the invention absorbs the major part of the collision forces without lateral movement or in other ways performs outside the established standards for an impact-attenuator during a collision.

During a collision against the impact attenuator the forward suspension of the hitting car (7) is pressed down, This means that the centre of gravity of the car is displaced towards the front wheels which gives rise to a first force (F2) and an increased friction between the front wheel and the road. The rear wheels (22) of the impact attenuator are also pressed against the road during the collision, because the front of the car is caught in the chess pattern of the collision plate, and give rise to a second force (F1). This means that the rear wheels (22) of the impact attenuator also contribute to a higher friction against the road. During the time of a collision there are accordingly four wheels pressed against the road in the driving direction of the car. During this lapse of time there are no lateral forces acting on the car (7) or the impact attenuator (1) worth mentioning. Both the car (7) and the impact attenuator (1) are therefore course stable during the lapse of collision. However, when the impact attenuator is pressed together (FIG. 3) and the retarding forces of the absorption part pushes the car backward lateral forces may arise.

Even during an offset collision (i.e. the vehicle hits the impact attenuator in the direction of driving a third from the side, ca. 6-7 dm from the centre) and flexible connection to the vehicle, the vehicle and impact attenuator are course stable. After a fourth of a second the collision is totally absorbed and in that moment all kinetic energy is transformed to heat and potential energy. The hitting vehicle bounces backward and ends up standing behind the impact attenuator. Test shows that the vehicle dose not spin around or ends up in the wrong driving lane, which is known to happen with other types of impact attenuator.

A further advantage with the invention compared to rigid connection to a vehicle is that the forces of collision are absorbed by the attenuating part and also by the damper, which reduces the thrust into the vehicle and the forces from that which may affect the driver. This is especially a problem since former impact attenuators have been designed against relatively heavy weight vehicles with high speed. A light-weight vehicle in low speed does not effect the impact attenuator enough to absorb the collision in an extent desired. The invention solves this by dampening the forces of collision in two steps. Lesser forces of collision are absorbed by the damper and the greater forces by the attenuating part.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An impact attenuator for a vehicle, comprising
a rear part, with a first wheel, arranged to an attenuating part, a front part, with a second wheel, arranged between the attenuating part and a coupling part for connection to the vehicle,
the coupling part including a damper for dampening at least a part of forces during a collision against the impact attenuator, a first end that is pivotably connectable to a single position on the vehicle, and a second end connected to the attenuating part, the impact attenuator being laterally movable relative to the vehicle both during transport and during operation.

2. The impact attenuator according to claim 1, wherein the damper dampens up to a pre-determined pressure against the damper, after which the attenuating part absorbs a remainder of the collision forces.

3. The impact attenuator according to claim 2, wherein the damper collapses when the predetermined pressure is reached.

4. The impact attenuator according to claim 2, wherein the damper includes a medium, which is evacuated at the predetermined pressure.

5. The impact attenuator according to claim 4, wherein the damper includes an air-damper with a pressure device for evacuating the air.

6. The impact attenuator according to claim 5, wherein the pressure device includes a safety valve or a bursting disc.

7. The impact attenuator according to claim 4, wherein the damper includes a hydraulic damper with a hydraulic accumulator.

8. The impact attenuator according to claim 2, further comprising a beam that transfers a part of the collision forces to the vehicle after the damper collapses.

9. The impact attenuator according to claim 8, wherein two beams are arranged with one beam on each side of the damper.

10. The impact attenuator according to claim 9, wherein the beams are arranged to transfer the forces of collision to the vehicle through a towing beam on which the towing device is arranged.

11. The impact attenuator according to claim 9, wherein beams are arranged to the front part.

12. The impact attenuator according to claim 1, wherein the damper includes a mechanical spring system.

13. The impact attenuator according to claim 1, wherein the rear part includes two wheels and the front part includes two pivot wheels.

14. An impact attenuator for a vehicle, comprising:
a rear part having a first wheel;
a front part having a second wheel and a coupling part for connection to the vehicle, the coupling part including (i) a damper that absorbs a portion of collision forces, (ii) a first end that is pivotably connectable to a single position on the vehicle, and (iii) a second end; and
an attenuating part that absorbs another portion of the collision forces and that is connected to the second end of the coupling part,
the impact attenuator being laterally movable relative to the vehicle both during transport and during operation, and
the damper being configured to absorb the collision forces up to a predetermined pressure, and the attenuating part being configured to absorb a remainder of the collision forces.

15. The impact attenuator according to claim 14, wherein the damper collapses when the predetermined pressure is reached.

16. The impact attenuator according to claim 15, wherein the damper includes a medium that is evacuated from the damper at the predetermined pressure.

17. The impact attenuator according to claim 16, wherein the medium is air or a hydraulic fluid, and further comprising a pressure device that effects the evacuation of the medium.

18. The impact attenuator according to claim 15, further comprising two beams that transfer a portion of the remainder of the collision forces to the vehicle after the damper collapses, the two beams being arranged with one of the beams on each side of the damper.

* * * * *